Nov. 17, 1942.         J. G. RAYNIAK         2,302,505
METHOD OF MANUFACTURING WELDED ALUMINUM ARTICLES
Filed Aug. 2, 1940         3 Sheets-Sheet 1

INVENTOR
JOSEPH G. RAYNIAK
BY
Wheeler, Wheeler & Wheeler
ATTORNEYS.

Nov. 17, 1942. J. G. RAYNIAK 2,302,505
METHOD OF MANUFACTURING WELDED ALUMINUM ARTICLES
Filed Aug. 2, 1940 3 Sheets-Sheet 2

INVENTOR
JOSEPH G. RAYNIAK
BY
Wheeler, Wheeler & Wheeler
ATTORNEYS

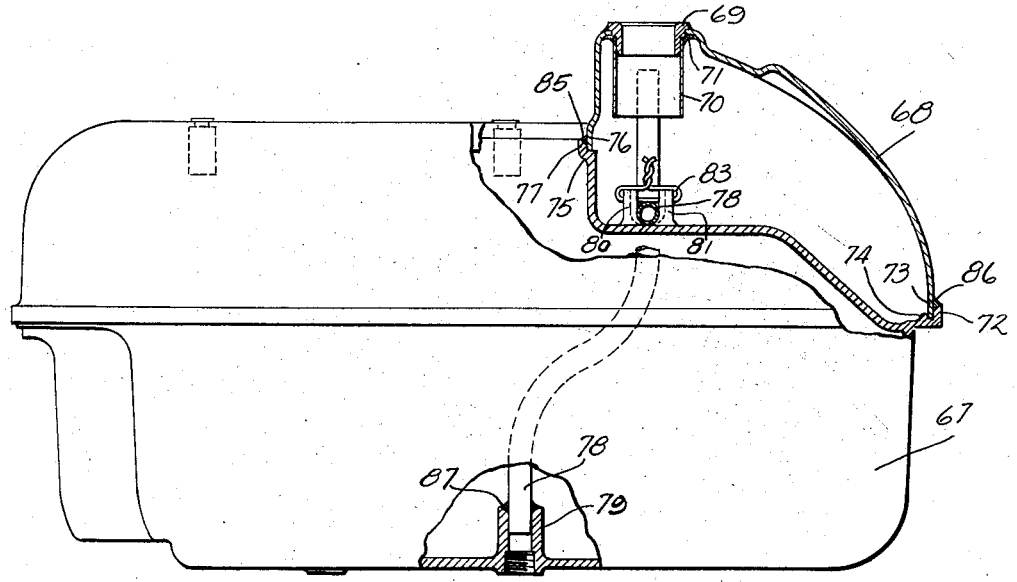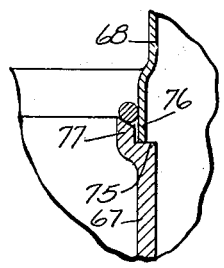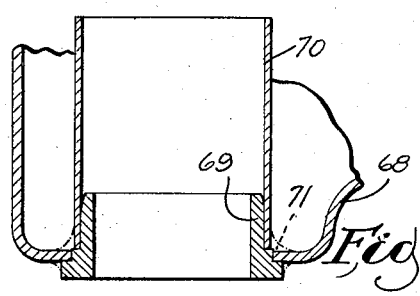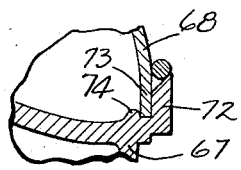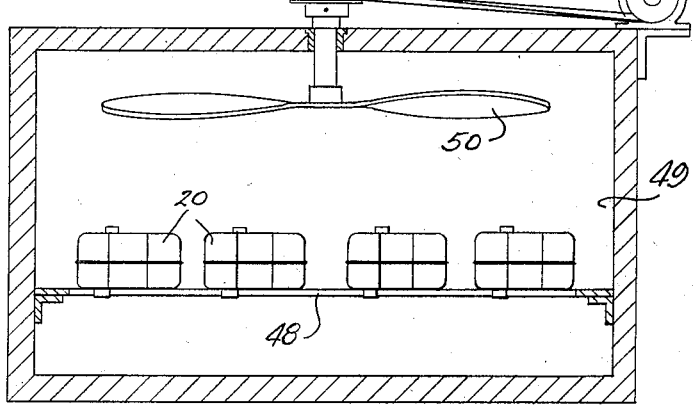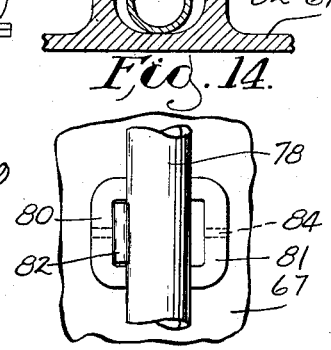

Patented Nov. 17, 1942

2,302,505

UNITED STATES PATENT OFFICE 2,302,505

METHOD OF MANUFACTURING WELDED ALUMINUM ARTICLES

Joseph G. Rayniak, Waukegan, Ill., assignor to Outboard, Marine & Manufacturing Company, Waukegan, Ill., a corporation of Delaware Application August 2, 1940, Serial No. 349,518

15 Claims. (Cl. 29—148.2)

This invention relates to improvements in welded aluminum articles and method of manufacture thereof.

It is the primary object of the invention to provide a novel and simple means whereby aluminum parts preformed to desired shape may be connected by welding them under properly controlled conditions in a furnace, it being one of the important features of the invention to provide for the initial mechanical connection of the various parts to hold them in proper positions for the welding operation and the filleting of all joints as an incident to the welding.

Another object of fundamental importance is the welding of formed sheet aluminum to cast aluminum, and particularly the production of a closed tank in which various parts are welded to the sheet aluminum component of the tank in one operation followed by the use of a furnace welding operation at a lower temperature to close the tank by welding the component sheet and cast parts thereof together.

Another object of the invention is to provide means for protecting a substantially closed receptacle from exploding due to the accumulation of gases incident to a furnace welding operation.

Another object involves the provision of an improved process whereby such closed receptacles as outboard motor fuel tanks may be made to have the appearance of being formed in one piece without seams.

A still further object of the invention is to use the surplus welding stock for reinforcing the welded article as required.

Other objects will be apparent to those skilled in the art upon scrunity of the following disclosure of the invention.

In the drawings:

Fig. 10 is a view partially in side elevation and partially in section showing a further modified embodiment of the invention in which sheet and cast aluminum parts are joined.

Fig. 11 is a fragmentary detail view on an enlarged scale showing inverted for welding the component parts comprising the top section of the tank shown in Fig. 10.

Fig. 12 is a fragmentary detail view on an enlarged scale showing in section the lap joint between the cast and sheet metal parts preliminary to the welding operation.

Fig. 13 is an enlarged detail view in section showing another type of lap joint used between the component parts of the device of Fig. 10.

Fig. 14 is an enlarged detail view in cross section showing means for mechanically retaining a pipe in the assembly of Fig. 10 pending the welding thereof.

Fig. 15 is a fragmentary detail view in plan of the parts shown in Fig. 14.

Fig. 16 is a diagrammatic view in cross section through an oven in which welding is practiced in accordance with the present invention.

Like parts are identified by the same reference characters throughout the several views.

Figure 1:
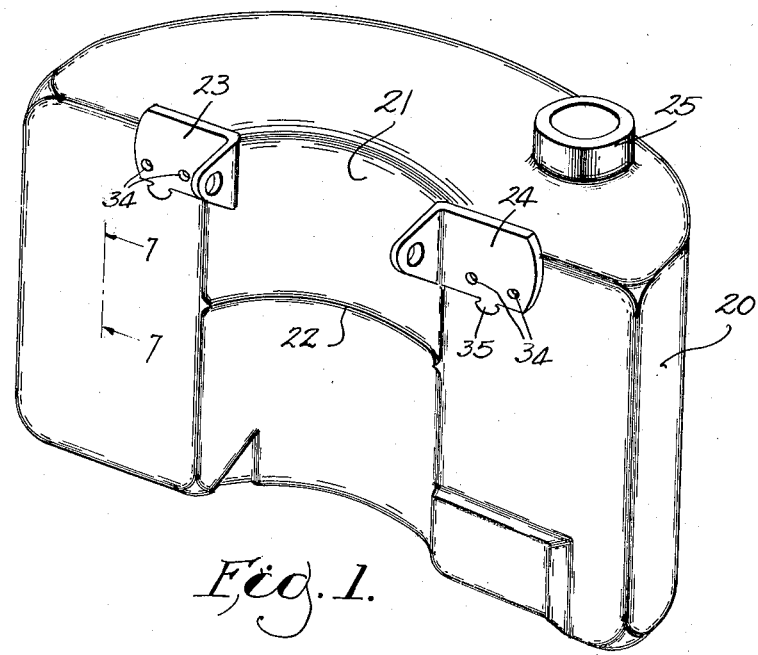
Fig. 1 is a view in perspective of one embodiment of the invention comprising a completed outboard motor fuel tank.

The device shown in Fig. 1 comprises a tank generically designated by reference character 20, having a generally semi-annular form to partially surround the portions of the engine supplied with fuel by such tank. The inner concave surface 21 of the tank, because it lies adjacent the engine, need not be finished to the same degree as the exteriorly exposed portions of the tank. Consequently there is clearly apparent at 22 a ridge formed by the welding operation as will hereinafter be described. Elsewhere the outer surface of the tank is entirely smooth and has all the appearance of having been made in one piece without seams.

Joined to the tank are the mounting brackets 23 and 24 by which the tank is supported. Also joined to the tank is a threaded nipple 25 to which the gasoline filler cap is applied. Joined to the tank at its bottom and showing in Fig. 2, is a smaller nipple 26 for the connection of the outlet pipe to the carburetor.

In the past such tanks have been assembled and soldered or otherwise fastened together by hand at a relatively much higher expense than is involved in the method hereinafter to be disclosed.

Figure 2:
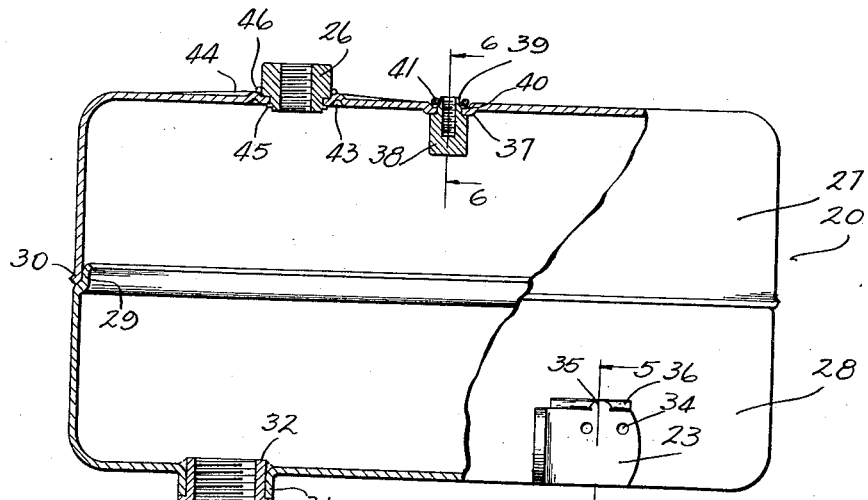
Fig. 2 is a view partially in side elevation and partially in section through the component parts of the tank shown in Fig. 1 as such parts appear inverted in position for welding.

According to the method of the present invention the lower half 27 of the tank and the upper half 28 thereof are separately formed from sheet aluminum and so designed as to provide a lap joint of a nature to mechanically position one half with respect to the other when the two halves are superposed in inverted positions for welding as shown in Fig. 2. In this particular arrangement the inner margin 29 of the upper part 28 of the tank is formed inwardly and the upper margin 30 of the lower part 27 of the tank is either left straight or flared slightly outwardly as shown in Fig. 2 so that the two margins lap to position the inverted lower portion 27 firmly on the inverted upper portion 28.

The nipple 25 is made to be received with a pressed fit into the flange 31. Its shank portion 32 is of such length as to project slightly to the interior of the tank.

The brackets 23 and 24 are each provided with punch pricks or rivets at 34 to mechanically secure the brackets in the desired positions pending the welding operation. Each bracket has an upstanding lug at 35 to hold a short length of weld rod 36 in position pending the oven treatment.

The portion 37 of tank part 27 which is to receive the mounting bushing 38 is pressed slightly upwardly from the plane of the adjacent material as shown in Fig. 2, so that when the parts are inverted for welding there is a slight recess surrounding the shank portion 39 of the bushing. A part of the metal comprising the shank is upset as indicated at 40 to provide a temporary connection for holding the bushing in place. In the recess about the shank portion is placed an annular piece of welding rod at 41.

Figure 3:
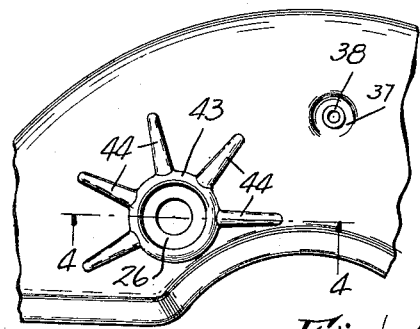
Fig. 3 is a fragmentary detail view in plan of a portion of the structure shown in Fig. 2.
Figure 4:
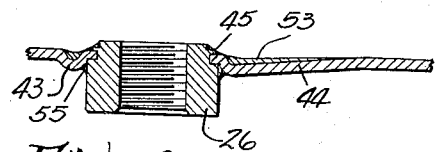
Fig. 4 is a view taken in section on an enlarged scale on the line 4—4 of Fig. 3.
Figure 5:
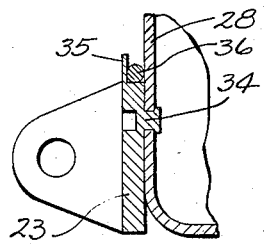
Fig. 5 is a detail view taken in section on an enlarged scale on the line 5—5 of Fig. 2.
Figure 6:
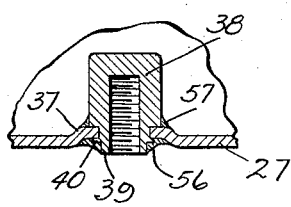
Fig. 6 is a detail view on an enlarged scale taken in section on the line 6—6 of Fig. 2.

Because of vibration some reinforcement of the tank is needed adjacent the nipple 26 to which the gasoline pipe is connected. Accordingly the bottom of the tank is annularly beaded at 43 as best shown in Fig. 3, and from the bead radial ribs 44 project. Here also, the reduced portion of the nipple is passed through the tank and upset at 45 to provide a temporary mechanical anchorage. When the device is prepared for the oven a ring of weld rod at 46 is slipped over the nipple where it rests in the crevice between the nipple and the bead 43.

In actual practice the aluminum sheet preferred for use in the manufacture of the parts assembled according to the invention is preferably a sheet known commercially as Alcoa 3S, a product of the Aluminum Company of America, comprising an aluminum alloy including approximately 1.2% manganese. For making the joint between the component parts 27 and 28 and other joints for which weld material may be supplied by flowage, it is convenient to have the aforesaid aluminum sheet superficially coated with an alloy so bonded thereto by rolling as to appear as one sheet, a suitable alloy being an alloy of aluminum with approximately 5% of silicon content. In practice silicon alloy represents approximately 10% of the total thickness of the finished sheet. The manganese aluminum alloy known as Alcoa 3S has a melting point of 1220 degrees F. Such screw machine fittings as the parts 25, 26 and 38 are conveniently made of similar alloy. The silicon coating material on the inner face of the sheet melts at approximately 1175 degrees F. The weld rod or wire used at 36, 41 and 46 likewise has a melting point of approximately 1175 degrees F. Before being assembled the component aluminum parts are dipped or sprayed with a suitable flux such as is made commercially available by the Aluminum Company of America.

A series of tank parts preliminarily assembled and mechanically held together as shown in Fig. 2 are placed in the inverted position of Fig. 2 upon a tray 48 and placed in the oven 49 as shown diagrammatically in Fig. 16. It is immaterial whether the oven be heated electrically or with gas or with oil or otherwise, but it is necessary that the temperature be controlled with considerable accuracy so as to be maintained between 1175 and 1190 degrees F. whereby the silicon coating will melt and flow on the interior surfaces of the sheets comprising the tank and the silicon alloy weld rod or wire will also melt and flow to bond the parts with which it is associated, without so softening the component parts 27 and 28 of the tank as to destroy their original form.

It has heretofore been thought to impossible to furnace weld closed or substantially closed, tanks, or containers, on a commercial scale because of the development of explosive gases which, in the course of their combustion, would deform the softened articles. In accordance with the method of the present invention that problem is solved by providing for a rapid circulation of air through the tanks. For this purpose it is sufficient to use a fan 50 somewhat larger and rotating at a somewhat higher speed than would normally be used to maintain the temperature uniform in the oven. This fan establishes air currents which pass into the tanks or containers through the upwardly exposed nipples 26 and from the downwardly exposed nipples 25. Thereby the explosive gases are vented from the tanks sufficiently so that they do not burn or explode therein.

Figure 7:
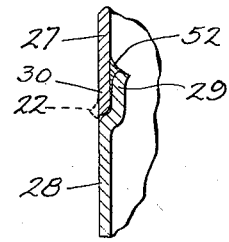
Fig. 7 is a detail view on an enlarged scale taken on the line 7—7 of Fig. 1.
Figure 8:
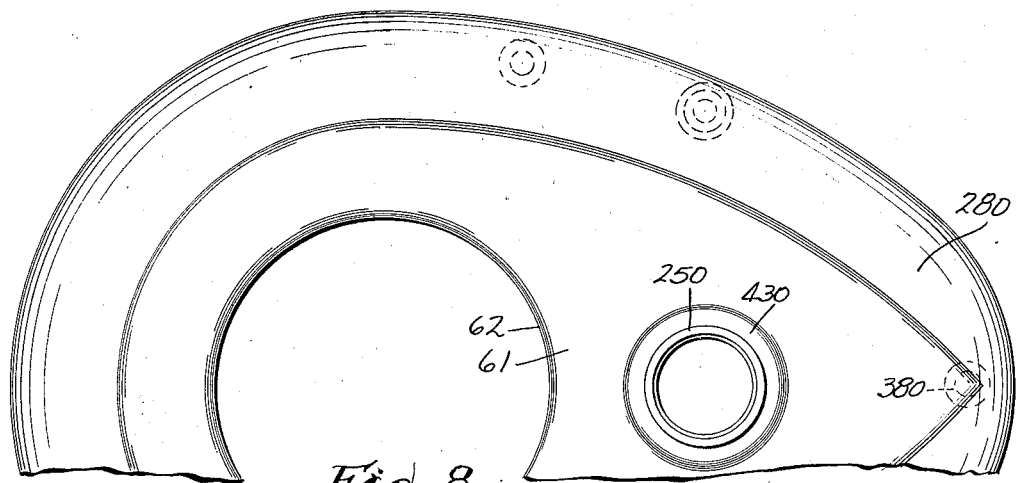
Fig. 8 is a fragmentary plan view of a modified embodiment of the invention.

As a result of the oven treatment the lap joint between the margins 29 and 30 of the tank parts 28 and 27 is neatly welded by the aluminum alloy coating which flows down the inner circle of the sheet. Surface tension holds the material wherever there is a crevice and it forms a neat fillet such as that shown at 52 in Fig. 7. Assuming that the margin 30 is outwardly flared, there exists on the finished product an outwardly exposed rib such as that shown at 22 in Fig. 1 and in dotted lines in Fig. 7. This rib is unobjectionable except from the standpoint of appearance, and where it is felt that the appearance of the tank will be improved the rib may be ground off. The resulting joint is imperceptible and the tank appears to be made seamlessly in one piece.

All of the other joints served either by the flowage of the silicon alloy, weld rod, or wire are similarly filleted. The reinforcing ribs 44, despite the fact that they are formed upwardly in the inverted position in which the welding takes place as shown in Fig. 2, nevertheless attract by surface tension sufficient quantities of material 53 to provide a definitely thickened rib as shown at 44. The melting of the ring 46 provides a fillet at 55. The melting of ring 41 provides a fillet at 56, while the flowage of the silicon alloy coating provides an interior fillet at 57.

As a result the parts are not only welded together but are reinforced by suitable fillets at all points of stress.

Figure 9:
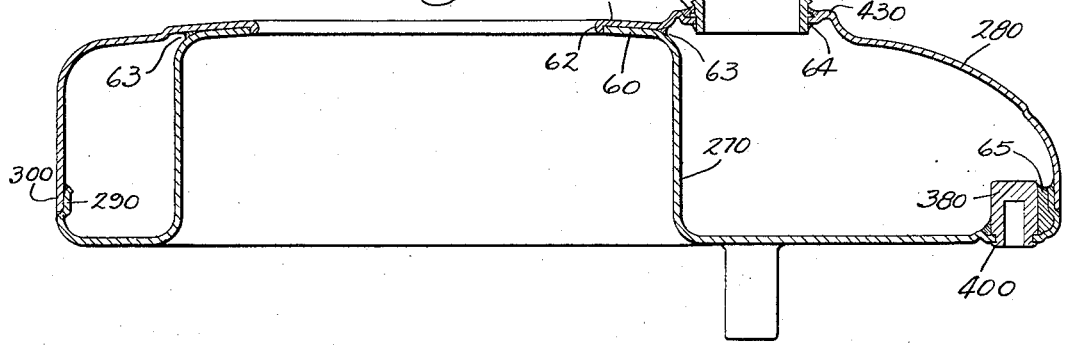
Fig. 9 is a view in longitudinal section of the embodiment shown in Fig. 8.

In the construction shown in Figs. 9 and 10 the process is quite similar to that already disclosed but the tank has an annular form. The base 270 provides the inner periphery at the bottom of the annulus while the part 280 provides the outer periphery at the top. In this construction it is not expedient to invert for the welding operation. Consequently the margin 290 of the lower tank part 270 is formed inwardly to receive telescopically the margin 300 of tank part 280. The interengagement of these differentially sized margins holds the tank parts in mechanical assembly pending the welding operation. The mounting boss 380 is a screw machine part having its reduced end passed through the tank member 270 and there upset or riveted at 400. The nipple 250 for the gasoline cap is simply inserted into an aperture in the tank member 280 where it rests without anchorage. It is, however, surrounded by a bead 430 to provide a crevice or channel in which a welding wire ring may be placed to provide the material for the fillet 59.

At the top central portion of the inner periphery of tank part 270 this part is provided with an inturned flange 60 overlaid by a similar annular flange 61 of the complementary tank part 280. Flange portion 61 is preferably turned inwardly at 62 over the edge of flange 60. Since the inner surfaces of the sheets from which tank parts 270 and 280 are formed are coated with silicon aluminum alloy as above described, it will be apparent that the alloy coatings will be brought together between the flanges 60 and 61.

When this tank is heated to welding temperatures in the furnace as above described, the coatings between flanges 60 and 61 will melt and bond such flanges permanently together to provide a very rigid double ply flange at this point, the two flanges being filleted at 63 where they diverge. In addition to the fillet provided externally about the filler cap nipple 250 at 59, there is an interior fillet 64 formed by the surface tension which draws the melted coating into every corner and crevice. Although the mounting bushing 380 is located at some distance from the inturned margin 290, it will be found that the intervening space will be substantially completely filled by a fillet 65 as shown in Fig. 9.

The structure shown in Figs. 10 to 15 involves a tank of so complex a form as to make impractical the stamping of the lower component tank part. Accordingly, although even the hand operated welding of sheet aluminum to cast aluminum has not heretofore been proposed, it has been found possible to make the lower component tank part 67 of an aluminum casting while making the upper component tank part 68 of aluminum alloy sheet similar to that used in the tanks already described.

It is not necessary to an understanding of the present invention to explain in detail the structure of the tank. The material used in the casting is preferably an aluminum alloy containing about 5% silicon and having a melting temperature of 1150 to 1175 degrees F. Since this is the same temperature at which the coating melts in the sheet previously described, it is obviously necessary that the joint between the sheet 68 and the casting 67 be accomplished at a lower temperature than that used in the previously described operations. Accordingly a welding wire is used between the sheet and the casting which is known as Alcoa X19 and was developed for this purpose, having a composition of 10% silicon, 1% zinc, 4% copper and the remainder of aluminum. Such a wire has a melting point of approximately 1040 degrees F. This difference in welding temperatures makes it possible to assemble this tank in two oven welding operations. In the first operation the filler bushing 69 and its associated sleeve 70 are welded into the top tank section 68 in the manner already described, at an oven temperature of 1175 to 1190 degrees F., the inner coating of the sheet material comprising tank section 68 forming, when melted, the usual fillet at 71. Only after this operation is completed is the tank section 68 placed on the cast tank section 67. The lower section preferably has an external flange at 72 in which the lower margin 73 of the top tank section 68 is received. The casting may also provide an inner positioning rib at 74 to receive and confine any flowage of melted material from the sheet 68.

At a higher level at the inner periphery, the casting section 67 provides a shoulder 75 upon which the margin 76 of the sheet metal portion 68 of the tank rests. Outside of shoulder 75 the cast portion of the tank has an offset flange 77 inwardly beveled to receive a welding wire such as has already been described.

Before the parts are assembled together the pipe 78, required for this particular tank, is put in place. At its lower end it is inserted in a sleeve 79 cast integrally with the cast tank section 67. At an intermediate point the pipe 78 rests in a saddle formed by upwardly projecting arms 80 and 81 as shown in Figs. 14 and 15. Each of these arms is channeled and after the pipe 78 is positioned therebetween a short piece of weld rod 82 is laid on each side. For mechanical anchorage, pending the welding operation, a wire 83 may be passed through the apertures 84 of the arms 80 and 81. The extreme end of pipe 78 projects upwardly into the sleeve 70 when the top section of the tank is set in place as shown in Fig. 10. At this time the weld wire is positioned in the crevice provided by the beveled inner peripheral margin 77 of the cast portion of the tank, and likewise weld wire is positioned in the bevel provided by the flange 72 at the lower level of the outer periphery of the cast portion of the tank.

When the parts thus assembled are subjected to oven temperatures approximating 1040 degrees F. (having first, of course, been suitably fluxed, as by Alcoa flux No. 33) the low melting point welding wire fuses to produce fillets at 86 and 87.

Since the melting point of the weld wire used to unite the sheet material to the cast material is so much lower than the melting point used in the assembly of the screw machine parts to the sheet metal component of the tank, the results of the first welding operation on the sheet metal portion of the tank are not in any manner disturbed by the second operation which units the sheet metal portion to the cast portion.

It is to be understood that all reference to specific alloys is made merely by way of example. The invention here involved is not limited to the use of any particular alloys or materials provided only that the relative melting points permit of the operations herein disclosed. It is further to be understood that ordinary welding rod or wire may be used in all situations where the use of a coated aluminum sheet has been described. The coating is merely a convenient way of delivering the molten aluminum alloy to the desired point for effecting a welded union. From the standpoint of the invention here involved in its broader aspects any other way of delivering the lower melting point material to the joint would be equally acceptable.

I claim:

1. A method of making substantially closed aluminum tanks which comprises prefabricating from aluminum upper and lower portions of said tanks providing lap joints between said portions, mechanically connecting an extraneous part to at least one of said tank portions, assembling said tank portions with their respective joints in lapping relation, positioning in operative proximity to the lapped joints of said portions an aluminum alloy having a lower melting point than the melting point of said portions, and subjecting the assembly of said portions and said part and said alloy to an oven temperature below the melting point of said portions and said part, and above the melting point of said alloy, whereby to flow said alloy into the lap joints and about the mechanical connection of said part, whereby to weld said portions and part unitarily together.

2. The method of making an almost closed container which comprises prefabricating portions of said container providing an aperture of limited area in at least one such portion and providing marginally contacting surfaces on the respective portions, associating the said surfaces of the respective portions, positioning in operative relation to the contacting surfaces an alloy of lower melting point than the material of which said portions are prefabricated, subjecting the asembled portions and alloy to an oven temperature in excess of the melting point of said alloy and below the melting point of the component material of said portions while removing gases through said opening, whereby to prevent the deformation of said portions by combustion of such gases therein.

3. The process of manufacturing an aluminum fuel tank which comprises prefabricating from aluminum two component portions of said tank with mutually lapping marginal surfaces, the assembling of said portions with said surfaces in mutually lapped position, the positioning in operative relation to said surfaces of an aluminum base material of lower melting point than that at which said portions are fabricated, the oven welding of said portions and material to flow the material into the crevices between the mutually lapped surfaces of said portions, and the subsequent removal of exterior lapping parts of one of said tank portions at the joint between said component portions to a uniform surface.

4. A method of making a receptacle which comprises casting a concave base portion of the receptacle, die-forming a cover portion thereof from sheet material, and welding said portions together while maintaining sufficiently rapid circulation through the receptacle between the base and cover to carry off combustible gases.

5. The method of making an aluminum article which comprises casting from molten aluminum one portion of said article and stamping another portion thereof from sheet aluminum, providing said portions with mutually complementary abutting surfaces, assembling said portions with said surfaces in abutment, operatively associating with said surfaces a material of lower melting point than the melting point of either the prefabricated material or the cast material, and subjecting the assembly to a temperature sufficient to melt the welding material without melting either the cast or the prefabricated material, thereby to unite the cast and prefabricated portions.

6. The method of making an aluminum article which comprises die-forming one portion thereof from sheet aluminum, prefabricating an attachment to said portion, oven-welding said attachment to said portion at a predetermined temperature, casting another portion of the article from molten aluminum, and oven-welding the cast portion of the article to the die-formed portion thereof at a temperature below that required to melt the weld connecting the attachment to the prefabricated portion.

7. The method of making an aluminum receptacle which comprises casting one portion of the receptacle from molten aluminum, die-forming another portion thereof from a sheet aluminum material having a higher melting point than the cast portion, prefabricating at least one attachment of high melting point material, welding the attachment to the die-formed portion of the receptacle, assembling the die-formed portion of the receptacle to the cast portion thereof with parts of the respective portions in substantial contact, mechanically supporting a welding material in proximity to said parts, and subjecting the entire assembly of said portions, said attachment and said welding material to a temperature below the melting points of said portions and said attachment and the bond therebetween but above the melting point of the welding material, whereby to flow the welding material between the proximate parts of the respective cast and die-forming portions for the unitary connection thereof.

8. The method of making a receptacle having a plurality of small apertures at opposite sides thereof, which method consists in forming separately upper and lower component parts of said receptacle with abutting margins and providing each such part with an aperture, associating with at least one of said margins a welding material of lower melting point than the melting point of either of said portions, and the heat treatment of the assembled portions and welding material in an oven at a temperature sufficient to melt the welding material but insufficient to melt said portions while maintaining a continuous flow of gas into the aperture of one of said portions and from the aperture of the other.

9. The method of making an aluminum fuel tank, which comprises the preforming of a plurality of aluminum tank portions, the mechanical positioning of at least one aluminum fitting with respect to at least one of said portions, associating said tank portions, applying aluminum base welding material to the joint between said portions and to the joint between said fitting and the portion with respect to which said fitting is mechanically positioned, and oven treating the assembled portions and fitting to a temperature sufficient to melt the welding material, whereby simultaneously to integrate said portions and fitting.

10. The method of making an aluminum fuel tank, which comprises prefabricating a plurality of sheet aluminum tank portions, prefabricating aluminum fittings for at least one of said portions, applying the fittings to said last mentioned tank portion, and deforming said tank portion to provide means for positioning the fittings thereon, applying aluminum base welding material about the juncture between the respective fittings and said last mentioned tank portion and between said last mentioned tank portion and the other tank portion, and the oven welding of said tank portions and fittings simultaneously to an integral tank unit.

11. The method of making an outboard motor fuel tank having fuel inlet and outlet openings in its top and bottom, which method comprises separately prefabricating component parts of said tank while providing interengaging portions on the respective parts, positioning one of said parts upon the other with said portions in engagement, positioning a welding material upon one of the component parts in a position to flow when melted between said portions, oven heating the assembly of said parts and welding material at a temperature sufficiently high to melt said welding material while insufficient to melt said parts, and establishing in the oven a general current of moving gas to which the said openings are exposed in the general direction of gas movement, whereby to establish circulation into one of said openings and from the other at a rate sufficient to remove from the interior of the tank combustible gases formed during the oven heating.

12. The method of making outboard motor fuel tanks having top and bottom fuel receiving and discharge openings, which method comprises prefabricating separately from sheet and molten aluminum respectively different parts of said tanks having interengaging portions, assembling said parts in the mechanical form of hollow completed tanks, mounting upon each such assembly a supply of welding material along the interengaging portions of the individual parts, establishing a rapid circulation of gas within a heat treating oven, postioning the aforesaid assemblies in said oven with their respective inlet and discharge openings aligned with the direction of gas circulation and thereby inducing gas circulation through the hollow interiors of the respective tank assemblies, and raising the temperature in said oven during gas circulation through the respective assemblies to a point sufficient to melt the welding material while insufficient to melt the aluminum parts of the tank.

13. The method of making for outboard motors aluminum fuel tanks having fuel inlet and outlet openings, which method comprises prefabricating from aluminum separate component parts of the tank and fittings for attachment to said parts while providing inlet and outlet openings from the respective tank parts, mechanically assembling said tank parts and fittings with welding material for unitary handling, introducing the mechanical assembly parts, fittings and welding material into a heat treating oven, and raising the temperature of said oven to a point sufficient to melt the welding material while insufficient to melt the tank parts or fittings while maintaining a rapid circulation of the gases within the oven into one of the tank openings and out of another, whereby to withdraw from the tank gases formed during the heat treating which would otherwise be combustible therein.

14. The method of making outboard motor fuel tanks having fuel inlet and outlet openings, which method comprises prefabricating from aluminum one tank part and a fitting applicable thereto, mechanically assembling said tank part and fitting, applying a high melting point, welding material to the mechanical assembly at the joint between said part and fitting, oven welding the fitting and part to each other at a temperature sufficient to melt said welding material while inadequate to melt said part or fitting, prefabricating a second tank part joinable to the part first mentioned to constitute a completed hollow tank, mechanically assembling the first tank part and welded fitting to the second tank part, and supplying at the joint therebetween a welding material of lower melting point than the welding material joining the fitting to the first tank part, and oven heating the last mentioned assembly to a temperature insufficient to melt the first welding material while sufficient to melt the last mentioned welding material whereby to unite said tank parts.

15. The method of claim 14 in combination with the further step of maintaining a rapid circulation of gases through the last mentioned mechanical assembly of tank parts during the final oven heating thereof, whereby to carry off from the interior gases formed during the final heat treating operation which would otherwise be combustible in the tank between said parts.

JOSEPH G. RAYNIAK.